(12) United States Patent
Ainsworth et al.

(10) Patent No.: US 12,457,218 B2
(45) Date of Patent: Oct. 28, 2025

(54) METHODS AND SYSTEM FOR DISTRIBUTED CAMERAS AND DEMOGRAPHICS ANALYSIS

(71) Applicant: Tyco Fire & Security GmbH, Neuhausen am Rheinfall (CH)

(72) Inventors: Peter Alexander Ainsworth, Oxfordshire (GB); Ian C. Westmacott, Tewksbury, MA (US); Martin J. Donaghy, Antrim (GB); Derek Boyes, Armagh (GB); Terry Neill, Antrim (GB); John McKenna, Londonderry (GB); Anne Gallagher, Belfast (GB); Mark Paterson, Newtownards Down (GB); Ashish Italiya, Newtownabbey (GB)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 16/756,904

(22) PCT Filed: Nov. 2, 2018

(86) PCT No.: PCT/US2018/058976
§ 371 (c)(1),
(2) Date: Apr. 17, 2020

(87) PCT Pub. No.: WO2019/090091
PCT Pub. Date: May 9, 2019

(65) Prior Publication Data
US 2021/0201610 A1    Jul. 1, 2021

Related U.S. Application Data

(60) Provisional application No. 62/581,207, filed on Nov. 3, 2017.

(51) Int. Cl.
*H04W 4/02* (2018.01)
*A61B 5/1171* (2016.01)
(Continued)

(52) U.S. Cl.
CPC ....... *H04L 63/102* (2013.01); *G06Q 10/0631* (2013.01); *G06Q 10/1093* (2013.01);
(Continued)

(58) Field of Classification Search
CPC ...... G07C 9/257; G07C 9/00904; G07C 9/30; G07C 9/37; G07C 1/10; G06K 9/00255;
(Continued)

(56) References Cited

U.S. PATENT DOCUMENTS 4,777,478 A    10/1988  Hirsch et al.
6,904,168 B1 *  6/2005  Steinberg ............. G06V 40/161
                                                        382/165
(Continued)

FOREIGN PATENT DOCUMENTS

CN          105516659 A       4/2016
DE     10 2009 000 006         7/2010
(Continued)

OTHER PUBLICATIONS

International Preliminary Report on Patentability, mailed on May 14, 2020, from International Application No. PCT/US2018/058971, filed on Nov. 2, 2018. 7 pages.
(Continued)

*Primary Examiner* — Stephen R Burgdorf
(74) *Attorney, Agent, or Firm* — ArentFox Schiff LLP

(57) ABSTRACT

Methods and system for distributed cameras and demographics analysis are disclosed. In one embodiment, the enterprise security system includes a tracking system for tracking individuals within the enterprise, surveillance cameras that capture image data including the individuals within
(Continued)

the enterprise, a physical classifier module for determining physical characteristics of the individuals in the image data, and a security integration system for determining whether the tracked individuals match the physical characteristics.

15 Claims, 2 Drawing Sheets

(51) Int. Cl.

| | | |
|---|---|---|
| *G06Q 10/0631* | (2023.01) | |
| *G06Q 10/1093* | (2023.01) | |
| *G06V 40/16* | (2022.01) | |
| *G07C 9/00* | (2020.01) | |
| *G07C 9/25* | (2020.01) | |
| *G07C 9/30* | (2020.01) | |
| *G07C 9/37* | (2020.01) | |
| *H04L 9/40* | (2022.01) | |
| *H04N 7/18* | (2006.01) | |
| *H04W 4/029* | (2018.01) | |
| *A61B 5/16* | (2006.01) | |
| *G06Q 10/105* | (2023.01) | |
| *G06Q 50/26* | (2024.01) | |
| *G08B 13/196* | (2006.01) | |

(52) U.S. Cl.
CPC ......... *G07C 9/00904* (2013.01); *G07C 9/257* (2020.01); *G07C 9/30* (2020.01); *G07C 9/37* (2020.01); *H04L 63/105* (2013.01); *H04N 7/181* (2013.01); *H04W 4/029* (2018.02)

(58) Field of Classification Search
CPC ........... G06K 9/00771; G06K 9/00288; G06K 9/00221; G06K 9/00302; G06K 17/00; H04W 4/029; H04W 4/023; H04W 12/08; H04N 7/181; A61B 5/1176; A61B 5/16; A61B 5/165; A61B 2503/24; G08B 13/19608; G08B 13/00; H04L 63/105; H04L 63/102; G06V 20/52; G06V 40/166; G06V 40/172; G06V 40/16; G06V 40/174; G06F 17/30371; G06F 21/32; G06Q 10/06; G06Q 10/0631; G06Q 10/105; G06Q 10/1093; G06Q 30/018; G06Q 30/02; G06Q 50/26
USPC .......................................................... 340/5.2
See application file for complete search history.

(56) References Cited

U.S. PATENT DOCUMENTS

| | | | |
|---|---|---|---|
| 7,921,036 B1* | 4/2011 | Sharma ................. G06Q 30/02 | 705/14.66 |
| 8,219,438 B1 | 7/2012 | Moon et al. | |
| 9,711,034 B2 | 7/2017 | Daniel | |
| 9,858,632 B1* | 1/2018 | Shipman, Jr. .......... G06Q 50/26 | |
| 9,996,736 B2 | 6/2018 | Smith et al. | |
| 10,033,965 B1* | 7/2018 | Clements ............... H04N 7/147 | |
| 10,109,171 B1* | 10/2018 | M A M ................... G08B 21/02 | |
| 10,121,070 B2* | 11/2018 | Derenne ................ G06F 16/78 | |
| 10,176,513 B1 | 1/2019 | Koka et al. | |
| 10,716,473 B2* | 7/2020 | Greiner .................. G16H 40/67 | |
| 10,732,722 B1 | 8/2020 | Heraz | |
| 10,755,540 B1* | 8/2020 | Kocher .................. H04W 4/14 | |
| 11,176,357 B2* | 11/2021 | Wang .................... G06V 40/172 | |
| 2002/0083025 A1 | 6/2002 | Robarts et al. | |
| 2002/0132663 A1* | 9/2002 | Cumbers ............. G07F 17/3239 | 463/25 |
| 2002/0191817 A1* | 12/2002 | Sato ........................ G07C 9/37 | 382/118 |
| 2003/0210139 A1 | 11/2003 | Brooks et al. | |
| 2003/0217024 A1 | 11/2003 | Kocher | |
| 2004/0210159 A1 | 10/2004 | Kibar | |
| 2004/0234108 A1* | 11/2004 | Li ......................... G06V 10/768 | 382/116 |
| 2005/0075116 A1* | 4/2005 | Laird ..................... A61B 5/411 | 455/456.3 |
| 2005/0091338 A1 | 4/2005 | de la Huerga | |
| 2005/0284200 A1 | 12/2005 | Moon et al. | |
| 2006/0024020 A1* | 2/2006 | Badawy ................. H04N 7/142 | 348/E7.079 |
| 2006/0149589 A1 | 7/2006 | Wager | |
| 2006/0190419 A1* | 8/2006 | Bunn .................. G06K 9/00771 | 706/2 |
| 2008/0033752 A1 | 2/2008 | Rodgers | |
| 2008/0091515 A1 | 4/2008 | Thieberger et al. | |
| 2009/0328152 A1 | 12/2009 | Thomas et al. | |
| 2010/0153146 A1 | 6/2010 | Angell et al. | |
| 2010/0169134 A1 | 7/2010 | Cheng et al. | |
| 2010/0245536 A1 | 9/2010 | Huitema et al. | |
| 2011/0091847 A1 | 4/2011 | Carroll et al. | |
| 2011/0134214 A1 | 6/2011 | Chen et al. | |
| 2011/0134240 A1 | 6/2011 | Anderson et al. | |
| 2011/0202595 A1 | 8/2011 | Kakiuchi | |
| 2012/0262296 A1 | 10/2012 | Bezar | |
| 2013/0012790 A1 | 1/2013 | Horseman | |
| 2013/0027561 A1* | 1/2013 | Lee ..................... G06K 9/00302 | 348/150 |
| 2013/0101165 A1 | 4/2013 | Rexilius et al. | |
| 2013/0144914 A1 | 6/2013 | Libal et al. | |
| 2013/0155250 A1 | 6/2013 | Myers et al. | |
| 2013/0184592 A1* | 7/2013 | Venetianer ............. G06T 7/246 | 600/476 |
| 2014/0018059 A1 | 1/2014 | Noonan | |
| 2014/0104429 A1* | 4/2014 | Ward ..................... G07C 9/253 | 348/156 |
| 2014/0130076 A1 | 5/2014 | Moore et al. | |
| 2014/0139678 A1* | 5/2014 | Moriarty ................ G07C 9/257 | 348/152 |
| 2014/0207950 A1 | 7/2014 | Badiee et al. | |
| 2014/0210617 A1 | 7/2014 | Markwitz et al. | |
| 2014/0218164 A1 | 8/2014 | Mahapatra et al. | |
| 2014/0244264 A1 | 8/2014 | Thirumalainambi et al. | |
| 2014/0266604 A1* | 9/2014 | Masood ................. G06V 40/16 | 340/5.83 |
| 2014/0270383 A1 | 9/2014 | Pederson | |
| 2014/0278629 A1* | 9/2014 | Stephenson ........ G06Q 10/1091 | 705/7.13 |
| 2014/0307926 A1 | 10/2014 | Murakami et al. | |
| 2014/0339430 A1* | 11/2014 | Hillis ..................... G01N 22/00 | 250/358.1 |
| 2015/0028993 A1 | 1/2015 | Dyk et al. | |
| 2015/0193507 A1 | 7/2015 | Rappoport et al. | |
| 2015/0193718 A1 | 7/2015 | Shaburov et al. | |
| 2015/0213304 A1* | 7/2015 | Passe .................... G06V 40/166 | 382/124 |
| 2015/0278585 A1 | 10/2015 | Laksono et al. | |
| 2016/0078279 A1 | 3/2016 | Pitre et al. | |
| 2016/0104175 A1 | 4/2016 | Fanourgiakis et al. | |
| 2016/0110591 A1 | 4/2016 | Smith et al. | |
| 2016/0150124 A1* | 5/2016 | Panda ................... G06F 3/1238 | 358/1.14 |
| 2016/0170998 A1 | 6/2016 | Frank et al. | |
| 2016/0189149 A1 | 6/2016 | MacLaurin et al. | |
| 2016/0196728 A1* | 7/2016 | Suman ............. G08B 13/19613 | 382/103 |
| 2016/0203699 A1 | 7/2016 | Mulhern ................ G06V 20/52 | 340/573.1 |
| 2016/0217345 A1* | 7/2016 | Appel ...................... G06K 9/52 | |
| 2016/0267760 A1* | 9/2016 | Trani .................. G07C 9/00563 | |
| 2016/0302711 A1 | 10/2016 | Frank et al. | |
| 2016/0330217 A1 | 11/2016 | Gates | |
| 2016/0335870 A1* | 11/2016 | Yum ..................... G08B 25/08 | |
| 2016/0379046 A1* | 12/2016 | Crandall ............ G06Q 10/1091 | 382/118 |
| 2016/0379047 A1 | 12/2016 | Natan et al. | |
| 2016/0379145 A1* | 12/2016 | Valentino, III ....... G06Q 10/105 | 705/7.13 |
| 2017/0046496 A1 | 2/2017 | Johnstone et al. | |

(56) References Cited

U.S. PATENT DOCUMENTS

| | | |
|---|---|---|
| 2017/0046566 A1 | 2/2017 | Smith et al. |
| 2017/0061202 A1 | 3/2017 | Shreve et al. |
| 2017/0083757 A1 | 3/2017 | Enomoto et al. |
| 2017/0148241 A1 | 5/2017 | Kerning et al. |
| 2017/0169284 A1* | 6/2017 | Chu .................. G06V 40/166 |
| 2017/0192994 A1 | 7/2017 | Hong et al. |
| 2017/0236029 A1* | 8/2017 | Howell .................. G06V 20/00 382/159 |
| 2017/0236397 A1 | 8/2017 | Myslenski et al. |
| 2017/0255880 A1* | 9/2017 | Daher .................... G06Q 10/02 |
| 2017/0280100 A1* | 9/2017 | Hodge .................. G06V 20/52 |
| 2017/0294063 A1* | 10/2017 | Hodge ................. H04N 13/204 |
| 2017/0311863 A1 | 11/2017 | Matsunaga |
| 2017/0351909 A1* | 12/2017 | Kaehler ............... G06V 40/171 |
| 2017/0357846 A1 | 12/2017 | Dey et al. |
| 2018/0047230 A1* | 2/2018 | Nye ......................... G07C 9/37 |
| 2018/0060157 A1 | 3/2018 | Packham et al. |
| 2018/0069975 A1 | 3/2018 | Honda et al. |
| 2018/0108192 A1* | 4/2018 | Ho .......................... G07C 9/253 |
| 2018/0114238 A1 | 4/2018 | Treiser |
| 2018/0124242 A1 | 5/2018 | Zimmerman |
| 2018/0154260 A1 | 6/2018 | Sawaki |
| 2018/0184959 A1 | 7/2018 | Takahashi |
| 2018/0300557 A1 | 10/2018 | Rodenas et al. |
| 2018/0308130 A1* | 10/2018 | Hafeez ............... G06Q 30/0265 |
| 2018/0336575 A1 | 11/2018 | Hwang et al. |
| 2019/0005841 A1 | 1/2019 | Loi et al. |
| 2019/0043207 A1* | 2/2019 | Carranza .............. G06V 40/172 |
| 2019/0050955 A1 | 2/2019 | Beaudet et al. |
| 2019/0059725 A1 | 2/2019 | Greiner |
| 2019/0073885 A1* | 3/2019 | Bess ....................... H04L 63/30 |
| 2019/0080274 A1 | 3/2019 | Kovach et al. |
| 2019/0110727 A1 | 4/2019 | Egi et al. |
| 2019/0122082 A1 | 4/2019 | Cuban et al. |
| 2019/0147676 A1* | 5/2019 | Madzhunkov .......... G06F 21/32 340/5.2 |
| 2019/0239795 A1 | 8/2019 | Kotake et al. |
| 2019/0279445 A1* | 9/2019 | Gallagher ................. G07C 9/25 |
| 2020/0005416 A1* | 1/2020 | Wade .................. G06K 9/00087 |
| 2020/0074156 A1 | 3/2020 | Janumpally et al. |
| 2020/0082438 A1* | 3/2020 | Tunstall ............. G06Q 30/0276 |
| 2020/0125838 A1* | 4/2020 | Dalley, Jr. ............. H04N 5/247 |
| 2020/0234523 A1 | 7/2020 | Ma et al. |
| 2020/0256113 A1* | 8/2020 | Salter ....................... B60J 5/101 |
| 2020/0302187 A1* | 9/2020 | Wang ..................... G06V 40/10 |
| 2020/0302715 A1* | 9/2020 | Tulsidas .................... G06T 7/20 |
| 2020/0334344 A1* | 10/2020 | Schwartz ............ H04L 63/0861 |
| 2020/0344238 A1* | 10/2020 | Ainsworth ............ H04W 4/023 |
| 2021/0042527 A1* | 2/2021 | Ton-That ................ G06V 10/82 |
| 2021/0182542 A1 | 6/2021 | Lau |
| 2021/0185276 A1 | 6/2021 | Peters et al. |
| 2021/0196169 A1* | 7/2021 | Ainsworth ............... G07C 9/37 |
| 2021/0201269 A1* | 7/2021 | Ainsworth ............ H04W 4/023 |
| 2021/0202067 A1 | 7/2021 | Williams et al. |
| 2021/0248541 A1 | 8/2021 | Heier |
| 2021/0298157 A1 | 9/2021 | Olaleye et al. |
| 2021/0374391 A1 | 12/2021 | Jorasch et al. |
| 2021/0374426 A1* | 12/2021 | Park ....................... G06V 20/52 |
| 2022/0207915 A1* | 6/2022 | Voss ....................... G07C 9/257 |
| 2022/0329589 A1* | 10/2022 | Buscemi .................. G06F 21/32 |
| 2022/0382840 A1 | 12/2022 | Weston et al. |

FOREIGN PATENT DOCUMENTS

| | | |
|---|---|---|
| DE | 102016000091 A1 | 7/2017 |
| JP | 2017033244 A | 2/2017 |
| JP | 2017073107 A | 4/2017 |
| JP | 2018138155 A | 9/2018 |
| JP | 6752819 B2 | 9/2020 |
| WO | 2013166341 A1 | 11/2013 |
| WO | WO 2016128842 | 8/2016 |
| WO | 2018096294 A1 | 5/2018 |

OTHER PUBLICATIONS

International Preliminary Report on Patentability, mailed on May 14, 2020, from International Application No. PCT/US2018/058976, filed on Nov. 2, 2018. 8 pages.

International Preliminary Report on Patentability, mailed on May 14, 2020, from International Application No. PCT/US2018/058984, filed on Nov. 2, 2018. 9 pages.

International Preliminary Report on Patentability, mailed on May 14, 2020, from International Application No. PCT/US2018/058996, filed on Nov. 2, 2018. 9 pages.

International Search Report and Written Opinion of the International Searching Authority, mailed on Dec. 21, 2018, from International Application No. PCT/US2018/058971, filed on Nov. 2, 2018. 8 pages.

International Search Report and Written Opinion of the International Searching Authority, mailed on Jan. 4, 2019, from International Application No. PCT/US2018/058976, filed on Nov. 2, 2018. 13 pages.

International Search Report and Written Opinion of the International Searching Authority, mailed on Dec. 21, 2018, from International Application No. PCT/US2018/058984, filed on Nov. 2, 2018. 14 pages.

International Search Report and Written Opinion of the International Searching Authority, mailed on Dec. 21, 2018, from International Application No. PCT/US2018/058996, filed on Nov. 2, 2018. 14 pages.

Turner, A., "Biometrics in Corrections: Current and Future Deployment," Corrections Today, 62-64 (2003).

Miles, A. C., et al., "Tracking Prisoners in Jail with Biometrics: An Experiment in a Navy Brig," NIJ Journal, 253: 1-4 (2006).

Miles, Christopher A. Cohn, Jeffrey P. Tracking Prisoners in Jail With Biometrics: An Experiment in a Navy Brig. National Institute of Justice. (Year: 2006).

Turner, Allan. Biometrics in Corrections: Current and Future Deployment. Corrections Today. (Year: 2003).

S. Mora, V. Rivera-Pelayo and L. Muller, "Supporting mood awareness in collaborative settings, " 7th International Conference on Collaborative Computing: Networking, Applications and Worksharing (CollaborateCom), 2011, pp. 268-277, doi: 10.4108/icst.collaboratecom.2011.247091. (Year: 2011).

M. Mumtaz and H. Habib, Evaluation of Activity Recognition Algorithms for Employee Performance Monitoring. Pakistan, 2012. (Year: 2012).

Gunes et al., "Emotion representation, analysis and synthesis in continuous space: A survey," 2011 IEEE International Conference on Automatic Face & Gesture Recognition (FG), 2011, pp. 827-834.

Anonymous, "Real-Time Optimization of Employee Productivity using Workplace Mood Analysis," IP.com Prior Art Database Technical Disclosure, Feb. 18, 2016, 5 pages.

Seddigh et al., "Does Personality Have a Different Impact on Self-Rated Distraction, Job Satisfaction, and Job Performance in Different Office Types?", PLoS One, May 25, 2016, 11 (5):e0155295, pp. 1-14.

Lutchyn, Y., et al., "MoodTracker: Monitoring collective emotions in the workplace," 2015 International Conference on Affective Computing and Intelligent Interaction (ACII), 295-301 (2015).

Sidhu, R.S., et al., "Smart surveillance system for detecting interpersonal crime," International Conference on Communication and Signal Processing (ICCSP), 2003-2007 (2016).

Noma-Osaghae, et al., "Design and Implementation of an Iris Biometric Door Access Control System", 2017, 2017 International Conference on Computational Science and Computational Intelligence (CSCI), 4 pages.

Mosley, et al., "Access Control and Monitoring in a Prison Environment", 1998, Proceedings IEEE 32nd Annual 1998 International Carnahan Conference on Security Technology (Cat. No. 98CH36209), 5 pages.

* cited by examiner

METHODS AND SYSTEM FOR DISTRIBUTED CAMERAS AND DEMOGRAPHICS ANALYSIS

RELATED APPLICATIONS

This application claims the benefit under 35 U.S.C. § 119(e) of U.S. Provisional Application No. 62/581,207, filed on Nov. 3, 2017, which is incorporated herein by reference in its entirety.

BACKGROUND OF THE INVENTION

Enterprises, such as private and public companies, municipal, state and federal governmental agencies, and other entities, will often maintain a number of disparate systems to facilitate their operations, track their business relationships, and maintain security. Enterprise Resource Planning (ERP) systems are computer systems that allow enterprises to manage operations. Employee Resource Management (ERM) systems are typically computer systems that allow the enterprises to track, schedule, and pay their employees. Access control systems are principally concerned with physical security and the selective access to, restriction of access to, and/or notification of access to the enterprises' buildings and secured parts of those buildings. In addition, other security systems are often employed by the enterprises to round-out their security needs. A common example is a surveillance system.

The ERM systems store and manage many different types of information associated with employees. The ERM system might execute on a single computer system or server, or across multiple computer systems and servers, or be implemented in a cloud-based computer system. The different types of employee information controlled and managed by the ERM systems include biographic, including demographic, information, payroll and salary information, job performance and attendance information, benefits information, and training and compliance information, to list some common examples.

Modern ERM systems typically encompass the functionality of multiple legacy systems that had separately managed and stored the different types of information associated with the employees. These legacy systems might have had separate payroll systems for the payroll and salary information, human resources systems for the biographic, job performance and attendance information, benefits systems for the benefits information, and learning systems for the training and compliance information, in examples. At the same time, the ERM system can simply be a collection of local or remote databases that store the different types of information associated with each employee.

Access control systems typically include access control readers. These readers are often installed at access points of the buildings to control access to restricted areas, such as buildings or areas of the buildings. Examples of access points include front and interior doors of a building, elevators, hallways connecting two areas of a building, to list a few examples. The access control readers authenticate identities of (or authorize) individuals and then permit those authenticated individuals to access the restricted areas through the access points. Typically, individuals interact with the access control readers by swiping keycards or bringing contactless smart cards within range (approximately 2-3 inches or 5 centimeters) of a reader. The access control readers read user information of the keycards, such as credentials of the individuals, and then the access control systems determine if the individuals are authorized to access the restricted areas. If the individuals are authorized to enter the restricted areas, then the access control readers allow access to the restricted areas by unlocking locked doors, signaling that doors should be unlocked, or generating alarms upon unauthorized entry, for example.

More recently, frictionless access control systems are being proposed and designed. These systems typically rely on individuals carrying beacon devices that can broadcast credentials, such as dedicated fob devices or personal mobile computing devices such as tablet or smart phone computing devices. These systems are "frictionless" in that the individual may not have made any overt gesture indicating a desire to access the restricted area, e.g., the individuals did not swipe a keycard. The access control systems will then monitor and track the individuals as they move through the buildings and automatically open access points such as doors when approached, assuming that the individuals are authorized to pass through those access points.

Enterprise surveillance systems are used to help protect people, property, and reduce crime. These systems are used to monitor buildings, lobbies, entries/exits, and secure areas within the buildings of the enterprises, to list a few examples. The surveillance systems also identify illegal activity such as theft or trespassing, in examples. At the same time, these surveillance systems can also have business uses. They can track employee locations across different rooms within buildings and among the different buildings of the enterprises.

In these surveillance systems, surveillance cameras capture image data of scenes. The image data is typically represented as two-dimensional arrays of pixels. The cameras include the image data within streams, and users of the system such as security personnel view the streams on display devices such as video monitors. The image data is also typically stored to a video management system (VMS) for later access and analysis.

Increasingly, it is being proposed to make these VMSs smarter. For example, VMSs with image analytics systems are becoming more prevalent. These analytics systems allow the VMSs to interpret the captured image data and possibly send alerts when detecting trespassing or other problems.

One common type of image analytics is facial recognition. In such instances, modules of the VMS will identify faces within the image data and compare those faces to databases to try to identify the different individuals captured in the image data.

SUMMARY OF THE INVENTION

The proposed security system tracks individuals, obtains physical characteristics, and determines whether the obtained physical characteristics are in agreement with stored physical characteristics for employees or other individuals associated with the enterprise. In one example, the stored physical characteristics for the employees are maintained in an ERM system. In this way, the system can act as a cross-check between the surveillance system and any information stored in connection with employees such as information stored in an ERM, among other things.

In general, according to one aspect, the invention features an enterprise security system. The enterprise security system includes a tracking system for tracking individuals within an enterprise, surveillance cameras that capture image data including the individuals within the enterprise, a physical classifier module for determining physical characteristics of the individuals in the image data, and a security integration system for determining whether the tracked individuals match the physical characteristics.

In one example, the tracking system includes an access control system for controlling access through access points in the enterprise. The tracking system may also alternatively or additionally include a surveillance system including the surveillance cameras and a facial recognition module, such as one executing on a video management system, for identifying individuals in the image data.

The enterprise security system can employ an employee resource management system. The employee resource management system has an employee database including biographic profiles of employees including demographic and physical information, which information is sent to the security integration system.

The security integration system can signal the access control system to suspend access for individuals when there is a mismatch for the physical characteristics.

In one implementation, the physical classifier module determines heights of the individuals, and the security integration system determines whether the heights of the individuals agree with a demographic profile of the individuals in an employee database.

In another implementation, the physical classifier module determines ages of the individuals, and the security integration system determines whether the ages of the individuals agree with a demographic profile of the individuals in the employee database.

In yet another implementation, the physical classifier module determines genders of the individuals, and the security integration system determines whether the genders of the individuals agree with a demographic profile of the individuals in the employee database.

In general, according to another aspect, the invention features an enterprise security method. The method includes tracking individuals within an enterprise, capturing image data of the individuals within the enterprise, determining physical characteristics of the individuals in the image data, and determining whether the tracked individuals match the physical characteristics.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
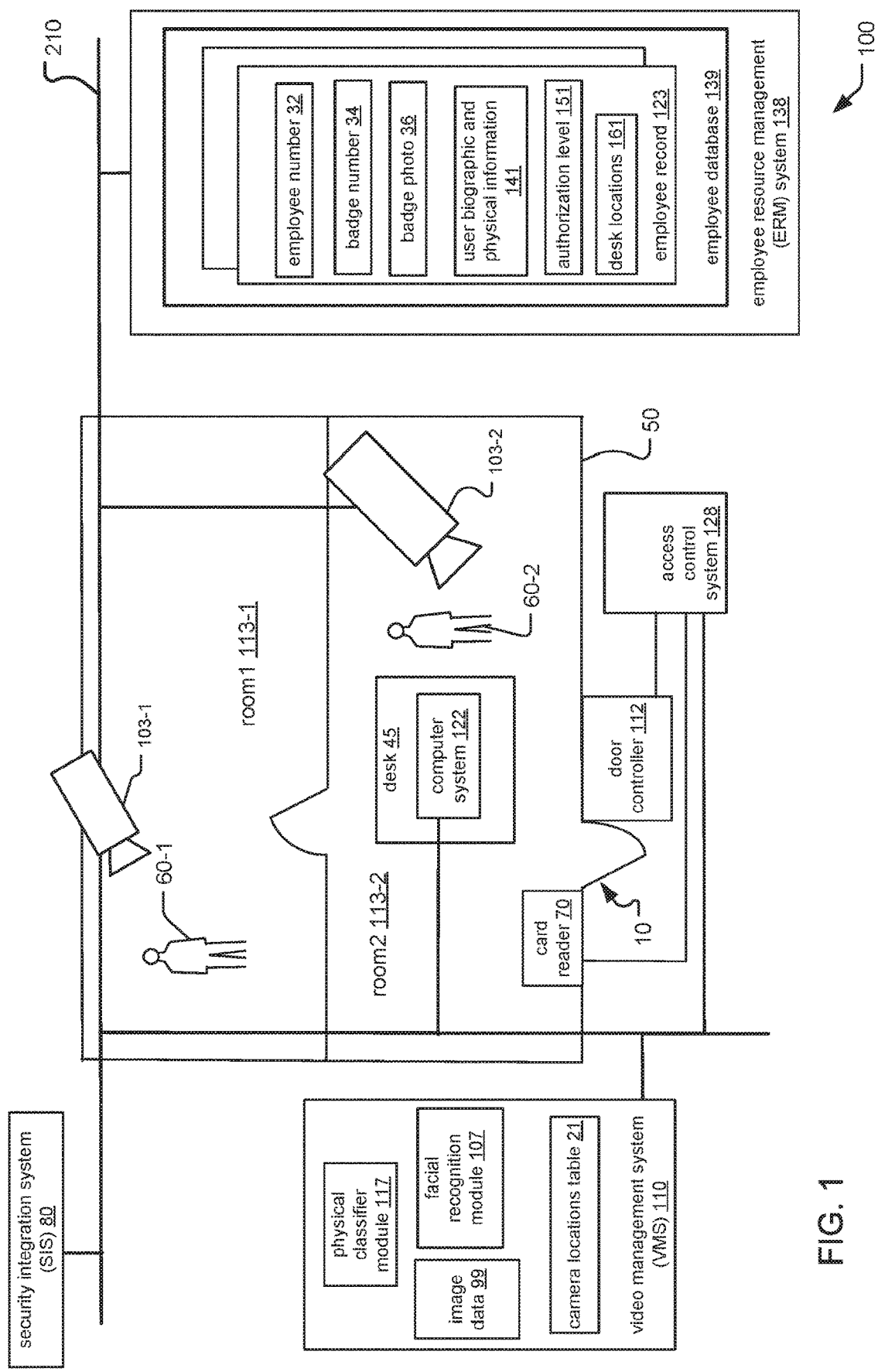
FIG. 1 is a schematic diagram showing rooms of an exemplary building of an enterprise and an enterprise security system installed at the building, in accordance with principles of the present invention.

FIG. 1 shows an exemplary enterprise including an enterprise security system 100, which has been constructed according to the principles of the present invention.

The figure shows surveillance cameras 103, client computer systems 122, and various other computer systems installed at a building 50 that carry out operations of the enterprise, along with a local or enterprise network 210. The other computer systems include an ERM system 138, a VMS 110, and an access control system 128. Finally, a security integration system (SIS) 80 provides some of the important functions of the present invention.

The ERM system 138 is preferably as described hereinabove. As such, the ERM system 138 has an employee database 139 that stores employee records 123 of employees 60. The employee records 123 include information for identifying each employee and locations of desks 45 within the building 50 for the employees. In more detail, each employee record 123 typically includes a name 24, an employee number 32, a badge number 34, a badge photo 36, user biographic including physical and demographic information 141, an authorization level 151, and one or more desk locations 161. The desk locations 161 list the locations of desks that the employee is authorized to be present at or is otherwise expected to be near during work hours. In addition, the ERM system 138 may also include other information such as databases that store the same information for contractors and visitors to the enterprise.

The user biographic information 141 includes information for identifying each individual 60. This information might include the following: a birthplace, home address, age, race, gender, hair color/length, and whether the individual typically wears glasses, in examples.

The access control system 128 controls physical access to access points 10 of the building 50. In the illustrated example, the access points are doors, but may also include hallways or elevators or floors within the buildings of the enterprise. Typically the access control system 128 further includes card readers for reading employee badges and/or frictionless readers that might validate employees based on credentials provided by a mobile computing device such as a smart phone. In this way, the access control system 128 is able to monitor movement of individuals through access points.

An enterprise surveillance system includes cameras 103 that capture image data 99 of the rooms 113 throughout the enterprise's building and thus images of individuals 60 in each room 113. Cameras 103-1 and 103-2 are respectively installed in rooms 113-1 and 113-2. The cameras 103 store their image data 99 to the VMS 110.

The VMS 110 stores the image data 99 from the cameras 103 and includes a camera locations table 21, a facial recognition module 107, and a physical classifier module 117. The camera locations table 21 typically has a record for each of the surveillance cameras 103. The record contains such information as the room 113 in which the camera 103 is installed. It may also include information concerning the type of camera and possibly even the field of view of the camera with respect to a map or floor layout of the building 50. The facial recognition module 107 determines facial recognition information of the individuals captured in the image data and monitors movement and/or activity of individuals 60 within the rooms 113. The physical classifier module 117 determines physical characteristics for the individuals/employees 60 from their images in the image data 99. Examples of these physical characteristics include an age, race, hair type, height, gender, and whether or not the individual is wearing glasses, in examples.

The VMS can be seeded with information concerning the enterprise's employees. For example, when the individuals are originally hired as employees, a guard or security operator or human resources representative would create the employee record 123 for each employee in the employee database 139. The security operator also takes a picture of the employee's face to use as the badge photograph 36. In one example, the facial recognition module 107 of the VMS 110 use the photograph 36 or other photograph to create stored facial recognition information for each of the employees. The physical classifier module 117 also determine the physical characteristics of the individuals from the photograph 36 and/or from the biographic information from the ERM 138.

The facial recognition information created and stored by the facial recognition module 107 can be of different types. In one example, the information is a biometric identifier such as a facial signature of the individual. In another example, the information is simply a still image of the person's face extracted from the image data, also known as a facial patch.

The facial signature for an individual is a unique value or set of values that represent the face of an individual/employee. The facial recognition module 107 often uses one or various predetermined facial signature algorithms to create the facial signature, based upon various features of each person's face. These features include the eyes, nose, mouth, eyebrows, cheekbones, and chin of each face, and distances between each of these features, in examples.

The facial recognition module also maps each instance of facial recognition information (e.g. the facial signature or facial patch) for each employee to a user credential or other identifier (OD). In this way, the OD associated with each instance of stored facial recognition information can be used to identify the individual for which the facial signature was obtained.

The VMS 110 then stores the facial recognition information and associated ID for identifying each employee. In one example, the VMS stores this information locally to the VMS 110. In another example, the VMS 110 might store this information to the employee record 123 for each employee. The VMS also stores the obtained physical characteristics to the employee record 123 for each employee 60.

The security integration system (SIS) 80 functions to integrate the operation of the tracking systems such as the access control system and surveillance system with the ERM system 138. The SIS 80 can take many different forms. As such, the SIS 80 can be a separate computer system or could be a process that executes on a computer associated with the VMS 110 or access control system 128, or even a separate computer system or a computer system integrated with the ERM computer systems.

The enterprise security system 100 generally operates as follows. After the individuals 60 are registered as employees, one or more individuals arrive at access points 10 such as doors of the building 50. The individuals typically present keycards that include their user credentials to the card readers 70 at the doors. The cameras 103 also capture and send the image data 99 of the individuals to the VMS 110.

In the illustrated example, multiple individuals 60 are located within and/or are moving about the rooms 113. Individual 60-1 is located in room1 113-1 and individual 60-2 is located in room2 113-2. Individual 60-2 is also located near the desk 45.

The ACS 128 and the VMS 110 each provide respective meta data streams to the SIS 80. In the case of the ACS 128, it provides a stream of access requests. The VMS 110 provides the facial recognition information and the physical characteristics for the identified individuals in its meta data stream.

Using the identified/tracked individuals in the meta data stream sent from the VMS 110, the SIS 80 obtains the associated employee records 123 for the individuals 60. The employee records 123 include demographic profiles of the employees including the biographic and physical information 141. The SIS 80 can then determine whether the tracked individuals 60 match the physical characteristics.

Figure 2:
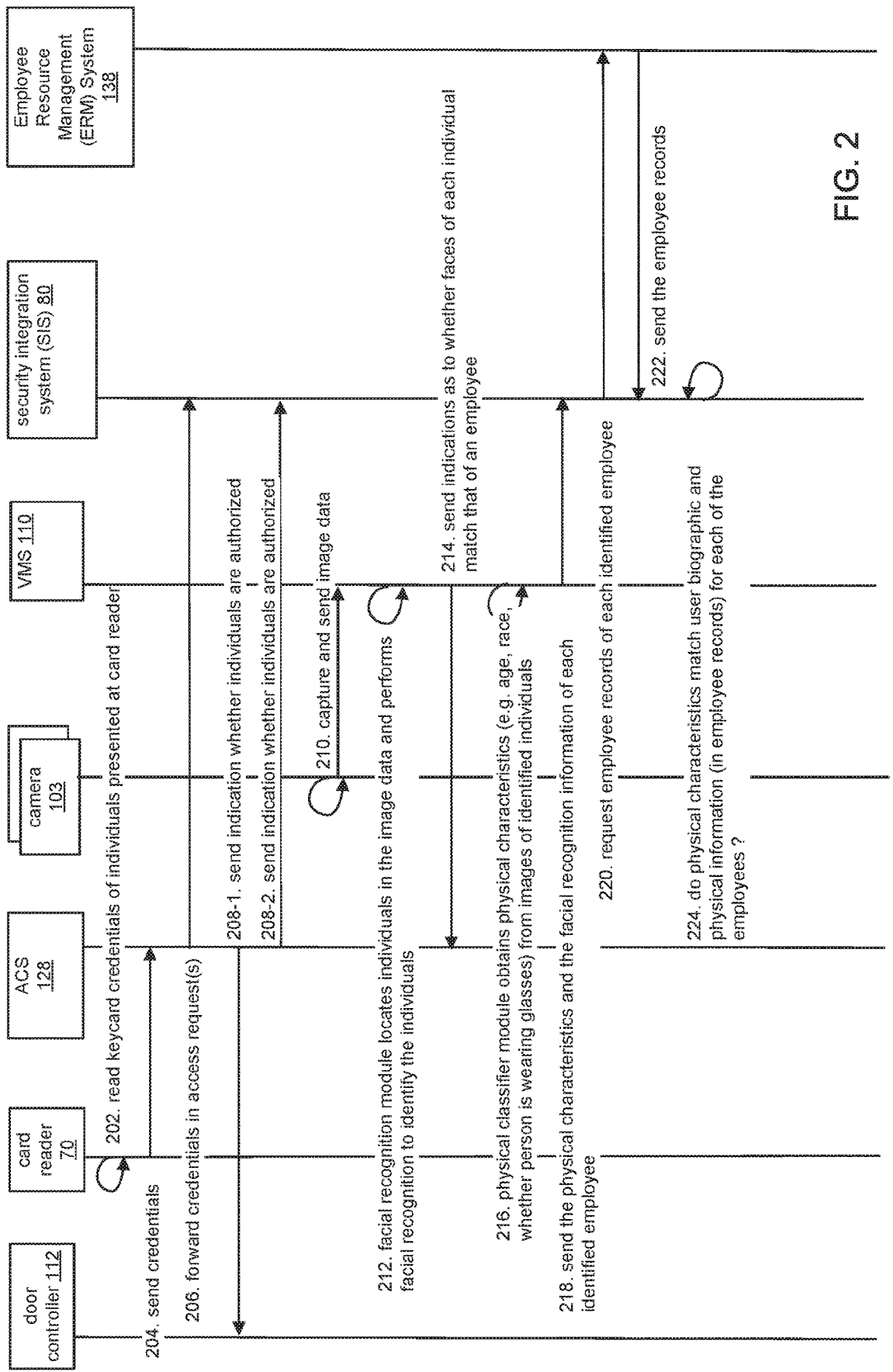
FIG. 2 is a sequence diagram showing operation of the enterprise security system in FIG. 1.

FIG. 2 is a sequence diagram that illustrates a method of operation of the enterprise security system 100.

In more detail, in step 202, one or more card readers 70 read keycard credentials of individuals 60 presented at the card readers. The individuals 60 present their credentials to obtain access to the access point 10. The card readers 70 send the credentials to the ACS 128 in step 204.

At the same time, according to step 206, the ACS 128 forwards the credentials in the access requests to the SIS 80.

In step 208-1, the ACS 128 sends an indication as to whether the individuals are authorized based upon the user credentials. In a similar vein, the ACS 128 in step 208-2 sends an indication to the SIS 80 as to whether the individuals 60 are authorized based upon the user credentials. Thus, the meta data stream provided by the ACS to the SIS 80 includes the identity of the individual seeking access through the access point, the location of that access point, and whether the individual was granted authorization to proceed through the access point by the ACS 128.

At the same time, in step 210, the cameras 103-1 and 103-2 within the rooms 113-1 and 113-2 of the building 50 capture the image data 99 of scenes in the rooms 113. The cameras 103 send the image 99 to the VMS 110 for storage and subsequent analysis.

In step 212, the facial recognition module 107 of the VMS 110 locates the individuals 60 in the image data 99 and performs facial recognition of the individuals to identify the individuals 60. For this purpose, the facial recognition module 107 preferably uses the same facial recognition algorithms used when the security operators first registered the individuals as employees.

According to step 214, the VMS 110 sends an indication to the ACS 128 as to whether faces of each individual 60 match that of an employee.

Then, in step 216, the physical classifier module 117 further obtains physical characteristics (e.g. age, race, whether person is wearing glasses) from the images of the identified individuals obtained in step 212. The VMS 110 sends the physical characteristics and the facial recognition information of each identified employee in a meta data stream to the SIS 80 for additional analysis.

It can also be appreciated that the facial recognition module 107 and the physical classifier module 117 can be included within and execute upon other components of the enterprise management system 100. In one example, the facial recognition module 107 and the physical classifier module 117 might be integrated within the cameras 103 and execute upon a microcontroller of the cameras 103. In other examples, these components might execute upon a microcontroller or central processing unit (CPU) of the ACS 128 or be located in a computer system that is remote to the enterprise, such as a cloud system. In yet another example, the facial recognition module 107 and the physical classifier module 117 could be located in different components.

In step 220, the SIS 80 requests the employee records 123 of each identified employee from the ERM system 138. The ERM system 138 sends the employee records 123 having the demographic profiles of the employees to the SIS 80 in step 222. The demographic profiles include the user biographic and physical information 141 of the employees 60.

The SIS 80, in step 224, matches the obtained physical characteristics to the user biographic and physical information 141 in the employee records 123 that the SIS 80 obtained in step 222.

Some examples of physical characteristics used during the matching are as follows. In one example, the physical classifier module 117 determines heights of the individuals 60, and the SIS 80 determines whether the heights of the individuals agree with the demographic profiles of the individuals 60 in the employee database 139. The demographic profile of each employee 60 includes the user biographic and physical information 141 in the associated employee record 123 obtained from the database 139 in step 222. In another example, the physical classifier module 117 determines ages of the individuals 60, and the SIS 80 determines whether the ages of the individuals agree with the demographic profile of the individuals 60 in the employee database 139. In still another example, the physical classifier module 117 determines genders of the individuals 60, and the SIS 80 determines whether the genders of the individuals agree with the demographic profile of the individuals 60 in the employee database 139.

When there is a mismatch for the physical characteristics, the SIS 80 can execute various operations in response. In one example, the SIS 80 can send alert messages to the security operators so that the operators will investigate. In another example, the SIS 80 can signal the access control system 128 to suspend access for the individuals 60.

While this invention has been particularly shown and described with references to preferred embodiments thereof, it will be understood by those skilled in the art that various changes in form and details may be made therein without departing from the scope of the invention encompassed by the appended claims.

What is claimed is:

1. An enterprise security system, comprising:
    at least one processor configured to:
        obtain keycard credentials of an individual from one or more card readers;
        send an indication to a security integration system indicating whether the individual is granted access to a secured location based on the keycard credentials;
        capture, via one or more surveillance cameras and based on sending the indication, image data of a scene including the individual;
        identify, based on performing facial recognition to the image data of the scene, the individual within the scene;
        obtain, by requesting from an employee resource management (ERM) system and based on identifying the individual, a demographic profile stored for the individual that indicates a height of the individual and an age of the individual;
        determine a determined height and a determined age of the individual from the image data; and
        provide access to the individual to a secure location based on determining that the determined height matches the height of the individual indicated in the demographic profile and that the determined age matches the age of the individual indicated in the demographic profile.

2. The enterprise security system of claim 1, further comprising one or more surveillance cameras to capture the image data.

3. The enterprise security system of claim 1, wherein the height is obtained from an employee database including the demographic profile and one or more additional demographic profiles of one or more employees.

4. The enterprise security system of claim 1, wherein the at least one processor is further configured to determine a determined hair type of the individual from the image data, and wherein the at least one processor is configured to provide access to the individual to the secure location based on determining that the determined hair type matches a hair type of the individual indicated in the demographic profile.

5. The enterprise security system of claim 1, wherein the at least one processor is further configured to determine a determined gender of the individual from the image data, and wherein the at least one processor is configured to provide access to the individual to the secure location based on determining that the determined gender matches a gender of the individual indicated in the demographic profile.

6. A method, comprising:
    obtaining keycard credentials of an individual from one or more card readers;
    sending an indication to a security integration system indicating whether the individual is granted access to a secured location based on the keycard credentials;
    capturing, via one or more surveillance cameras and based on sending the indication, image data of a scene including the individual;
    identifying, based on performing facial recognition to the image data of the scene, the individual within the scene;
    obtaining, by requesting from an employee resource management (ERM) system and based on identifying the individual, a demographic profile stored for the individual that indicates a height of the individual and a gender of the individual;

determining a determined height and a determined gender of the individual from the image data; and providing access to the individual to a secure location based on determining that the determined height matches the height of the individual indicated in the demographic profile and that the determined gender matches the gender of the individual indicated in the demographic profile.

7. The method of claim 6, further comprising receiving the image data from one or more surveillance cameras.

8. The method of claim 6, wherein the height is obtained from an employee database including the demographic profile and one or more additional demographic profiles of one or more employees.

9. The method of claim 6, further comprising determining a determined hair type of the individual from the image data, and wherein providing access to the individual to the secure location is based on determining that the determined hair type matches a hair type of the individual indicated in the demographic profile.

10. The method of claim 6, further comprising determining a determined age of the individual from the image data, and wherein providing access to the individual to the secure location is based on determining that the determined age matches an age of the individual indicated in the demographic profile.

11. A non-transitory computer-readable device having instructions thereon that, when executed by at least one computing device, causes the at least one computing device to perform operations comprising:

obtaining keycard credentials of an individual from one or more card readers;

sending an indication to a security integration system indicating whether the individual is granted access to a secured location based on the keycard credentials;

capturing, via one or more surveillance cameras and based on sending the indication, image data of a scene including the individual;

identifying, based on performing facial recognition to the image data of the scene, the individual within the scene;

obtaining, by requesting from an employee resource management (ERM) system and based on identifying the individual, a demographic profile stored for the individual that indicates a height of the individual and an age of the individual;

determining a determined height and a determined age of the individual from the image data; and providing access to the individual to a secure location based on determining that the determined height matches the height of the individual indicated in the demographic profile and that the determined age matches the age of the individual indicated in the demographic profile.

12. The non-transitory computer-readable device of claim 11, wherein the operations further comprise receiving the image data from one or more surveillance cameras.

13. The non-transitory computer-readable device of claim 11, wherein the height is obtained from an employee database including the demographic profile and one or more additional demographic profiles of one or more employees.

14. The non-transitory computer-readable device of claim 11, wherein the operations further comprise determining a determined hair type of the individual from the image data, and wherein providing access to the individual to the secure location is based on determining that the determined hair type matches a hair type of the individual indicated in the demographic profile.

15. The non-transitory computer-readable device of claim 11, wherein the operations further comprise determining a determined gender of the individual from the image data, and wherein providing access to the individual to the secure location is based on determining that the determined gender matches a gender of the individual indicated in the demographic profile.

* * * * *